United States Patent
Limaye

[11] Patent Number: 5,976,721
[45] Date of Patent: *Nov. 2, 1999

[54] CHEMICAL COGENERATION PROCESS

[76] Inventor: Santosh Y. Limaye, 3009 E. Alvera Cir., Salt Lake City, Utah 84117

[*] Notice: This patent is subject to a terminal disclaimer.

[21] Appl. No.: 08/931,090

[22] Filed: Sep. 15, 1997

[51] Int. Cl.⁶ .................................................. H01M 8/00
[52] U.S. Cl. .............................. 429/13; 429/30; 429/40; 429/33; 429/26
[58] Field of Search ................................. 429/13, 26, 30, 429/32, 33, 40, 44

[56] References Cited

U.S. PATENT DOCUMENTS

| | | |
|---|---|---|
| 3,294,587 | 12/1966 | Leduc ........................................ 429/13 |
| 4,366,211 | 12/1982 | Pollack . |
| 4,396,480 | 8/1983 | Hegedus et al. . |
| 4,413,041 | 11/1983 | Hegedus . |
| 4,454,207 | 6/1984 | Fraioli et al. . |
| 4,463,065 | 7/1984 | Hegedus et al. . |
| 4,515,871 | 5/1985 | Shirogami et al. . |
| 4,728,584 | 3/1988 | Isenberg . |
| 4,793,904 | 12/1988 | Mazanec et al. . |
| 4,857,420 | 8/1989 | Maricle et al. . |
| 4,913,982 | 4/1990 | Kotchick et al. . |
| 4,997,725 | 3/1991 | Pujare et al. . |
| 5,064,733 | 11/1991 | Krist et al. . |
| 5,071,717 | 12/1991 | Bushnell . |
| 5,145,754 | 9/1992 | Misawa . |
| 5,162,167 | 11/1992 | Minh et al. . |
| 5,208,115 | 5/1993 | Akagi . |
| 5,212,023 | 5/1993 | Diethelm . |
| 5,256,499 | 10/1993 | Minh . |
| 5,273,837 | 12/1993 | Aitken et al. . |
| 5,342,705 | 8/1994 | Minh et al. . |
| 5,356,728 | 10/1994 | Balachandran et al. . |
| 5,364,506 | 11/1994 | Gür et al. . |
| 5,368,951 | 11/1994 | Shiratori et al. . |
| 5,496,655 | 3/1996 | Lessing . |
| 5,587,251 | 12/1996 | Spach et al. . |
| 5,770,326 | 6/1998 | Limaye . |

OTHER PUBLICATIONS

Costas G. Vayenas et al., "Cogeneration: Electricity+Chemicals," Chemtech, Jul. 1991, pp. 422–428, American Chemical Society, US.

Cecily A. Romero et al., "The Value and Manufacturing Costs of Planar Solid Oxide Fuel Cell Stacks," Topical Report, Jul. 1996, pp. 3–8, Report No. TDA–GRI–96/0210, TDA Research, Inc., Wheat Ridge, CO, US.

Primary Examiner—Kathryn Gorgos
Assistant Examiner—Thomas H. Parsons
Attorney, Agent, or Firm—Joy L. Bryant

[57] ABSTRACT

A chemical cogeneration process for producing chemical products and cogenerating electrical energy is presented. The process comprises the steps of providing a monolithic mass and energy transfer cell. Heating the monolithic mass and energy transfer cell to a temperature ranging from about 25° C. to about 1000° C. Introducing an oxidant into the first set of passages and introducing a fuel into the second set of passages. The chemical products are recovered from the monolithic mass and energy transfer cell and the electric current is recovered through the external electric circuit.

10 Claims, 6 Drawing Sheets

CHEMICAL COGENERATION PROCESS

FIELD OF THE INVENTION

The present invention relates to a chemical cogeneration process. In particular, it relates to a chemical cogeneration process which uses a monolithic mass and energy transfer cell.

BACKGROUND OF THE INVENTION

Chemical cogeneration processes involve the reaction of a fuel with an oxidant to produce electricity and byproducts. These processes are sometimes also referred to as fuel cell processes. Such processes utilize electrochemical reactor cells to produce power and valuable chemicals. In these processes, the solid electrolyte cell functions as a fuel cell and as a chemical reactor. Fuel cells convert chemical energy into electricity with no intermediate combustion cycle. Consequently, their thermodynamic efficiency compares favorably with thermal power generation. Fuel cells convert inexpensive chemicals such as $H_2$, CO and $O_2$ into low-value products such as $H_2O$ and $CO_2$ while generating electrical power. However, there are several important industrial reactions, such as the conversion of $H_2S$ to $SO_2$ and of $NH_3$ to NO, that have free energy ($\Delta G$) values comparable to that of $N_2$ oxidation.

Gür et al. in U.S. Pat. No. 5,364,506 disclose an electrochemical reactor for partially oxidizing methane and cogenerating electrical energy. A solid-state ionic reactor is described in which a solid electrolyte is provided with a cathode and a perovskite type anode having a wide range of oxygen nonstoichiometry. The cell generates electrical energy as a result of the chemical potential difference brought about by the catalytic oxidation of methane at the anode with oxygen that chemically diffuses from the cathode through the solid-state ionic conductor.

Pujare et al. in U.S. Pat. No. 4,997,725 disclose a solid oxide fuel cell and process for direct conversion of natural gas into DC electricity concurrently with the electrocatalytic partial oxidation of methane to $C_2$ hydrocarbon species $C_2H_4$, $C_2H_6$, and minor amounts of $C_2H_2$. They disclose a solid oxide fuel cell comprising a metallic oxide oxygen reducing electronic and oxygen vacancy conducting perovskite cathode in contact on one side with an oxygen vacancy conducting solid electrolyte having high oxygen ion conductivity at fuel cell operation temperatures. An anode contacts the other side of the solid electrolyte and comprises a metallic oxide oxygen ion conducting perovskite layer contacting the solid electrolyte. A rare earth metallic oxide layer contacts the opposite side of the anode metallic oxide perovskite layer and is capable of dimerization of methane to predominately $C_2$ products. Their process includes passing oxygen containing gas in contact with the outside surface of the metallic oxide oxygen reducing electronic and oxygen vacancy conducting perovskite cathode forming oxygen ion. The formed oxygen ion is passed from the cathode to and through an oxygen vacancy conducting solid electrolyte having high oxygen ion conductivity at fuel cell operating temperatures to the anode contacting the other side of the solid electrolyte. The metallic oxide oxygen ion conducting perovskite anode layer is in contact with the solid electrolyte on one side and is also in contact with methane on the other side. The anode oxidatively dimerizes methane to $C_2$ species which are predominately $C_2H_4$. The $C_2$ species and electrons are withdrawn from the anode region.

Mazanec et al. in U.S. Pat. No. 4,793,904 describe an electrocatalytic process for producing synthesis gas from light hydrocarbons such as methane or natural gas. An electrochemical cell is provided which comprises a solid electrolyte having a first surface coated with conductive metal, metal oxide or mixtures thereof capable of facilitating the reduction of oxygen to oxygen ions; and a second surface coated with conductive metal, metal oxide or mixtures thereof, provided that both coatings are stable at the operating temperatures. The cell is heated to a temperature of at least 1000° C. An oxygen-containing gas is passed in contact with the first conductive coating and methane, natural gas or other light hydrocarbons are passed in contact with the second conductive coating. Lastly, a synthesis gas is recovered.

Krist et al. in U.S. Pat. No. 5,064,733 describe a process for concurrent gas phase electrocatalytic oxidative dimerization of methane at the anode on one side of a solid electrolyte and reduction of carbon dioxide to gaseous hydrocarbons at a cathode on the other side of the solid electrolyte. The process comprises passing methane containing gas in contact with a rare earth metallic oxide anode layer of an anode comprising a rare earth metallic oxide anode layer in contact with one side of an ionic and electronic conducting metallic oxide perovskite anode layer in contact with one side of a solid electrolyte on its opposite side. The anode catalytically oxidatively dimerizes the methane to $C_2$ species, transferring through the solid electrolyte an ionic species selected from the group consisting of an oxygen ion species from the cathode to the anode and a proton mediating ion from the anode to the cathode at cell operating temperatures. Carbon dioxide containing gas is passed in contact with one side of an ionic and electronic conducting metal cathode electrocatalyst capable of providing adsorption sites for carbon dioxide and chemisorbed and Faradaically generated hydrogen species in proximity to the adsorbed carbon dioxide and capable of catalytic reduction of the carbon dioxide to predominantly $C_2$ species. The produced $C_2$ species is withdrawn from the region of the anode and the cathode.

Many of these processes utilize fuel cells which have designs that face problems in thermal cycling. In particular, mechanical stresses result from imperfectly matched thermal expansion coefficients causing delamination. In addition, operation at high temperatures leads to electrode sintering, interfacial reactions and migration of species which cause a significant voltage degradation over time. Moreover, because of the high operation temperatures, there is a need for large, costly heat exchange equipment.

SUMMARY OF THE INVENTION

Accordingly, it is an object of the present invention to provide a chemical cogeneration process which utilizes a monolithic mass and energy transfer cell.

Another object of the present invention is to provide a chemical cogeneration process which utilizes a monolithic mass and energy transfer cell which does not suffer from thermal mismatch.

Another object of the present invention is to provide a chemical cogeneration process which operates at lower temperatures than traditional chemical cogeneration processes.

In accordance with the present invention, a chemical cogeneration process for producing chemical products and cogenerating electrical energy is provided. For the purpose of understanding the specification and the appended claims, chemical cogeneration is understood to also include fuel cell reactions and processes. By the present invention, a monolithic mass and energy transfer cell is provided. The monolithic mass and energy transfer cell comprises a monolithic ionically conductive core having an outer surface including a first entrance surface and a first exit surface spaced apart from the first entrance surface. A first set of passages are positioned between the first entrance surface and the first exit surface. A second set of passages are positioned between a second entrance surface and a second exit surface such that the second set of passages are in a non-parallel relationship to the first set of passages. A first porous, electrically conductive coating serving as a cathode is disposed within the first set of passages and a second porous, electrically conductive coating serving as an anode is disposed within the second set of passages. A first electrically conductive material is disposed within the first set of passages and a second electrically conductive material is disposed within the second set of passages. An external electric circuit is in electrical contact with the monolithic ionically conductive core.

The monolithic mass and energy transfer cell is heated to a temperature ranging from about 25° C. to about 1000° C. An oxidant is introduced into the first set of passages and a fuel is introduced into the second set of passages. Chemical products are recovered from the monolithic mass and energy transfer cell and an electric current is recovered through the external electric circuit.

Additional objects and advantages of the invention will be set forth in part in the description which follows, and in part will be obvious from the description, or may be learned by practice of the invention. The objects and advantages of the invention will be obtained by means of instrumentalities in combinations particularly pointed out in the appended claims.

BRIEF DESCRIPTION OF THE DRAWINGS

The accompanying drawings illustrate a complete embodiment of the invention according to the best modes so far devised for the practical application of the principles thereof, and in which.

DETAILED DESCRIPTION OF THE PREFERRED EMBODIMENTS OF THE INVENTION

The monolithic mass and energy transfer cell used in the process of the present invention is of a unique structure. Unlike other known monoliths, the monolithic cell of the present invention does not require any bonding between the layers and for the purposes of this specification and the appended claims, the term monolithic means a single whole cell requiring no bonding or cement material between the first and second sets of passageways. Indeed, the monolithic cell is fabricated as a single unit using any one-step fabrication process known to those skilled in the art wherein all of the passageways are formed at the same time. Examples of such processes include but are not limited to: injection molding, gel casting, slurry setting, and hot pressing. The advantage to having this true monolithic structure is that the thermal mismatch between the layers is greatly reduced.

In a preferred embodiment, the monolithic mass and energy transfer cell is fabricated in such a way that a first interlocking channel and a second interlocking channel protrude from the outer surface of the monolithic ionically conductive core. Each interlocking channel is a unibody piece of the monolithic ionically conductive core and each interlocking channel protrudes from the outer surface of the monolithic ionically conductive core such that each interlocking channel is configured to allow for connecting at least two monolithic mass and energy transfer cells together. The interlocking channels serve two purposes: 1) they allow any number of mass and energy transfer cells to be locked together to form an array; and 2) they serve as a support for the electrically conductive perforated plates.

Figure 1:
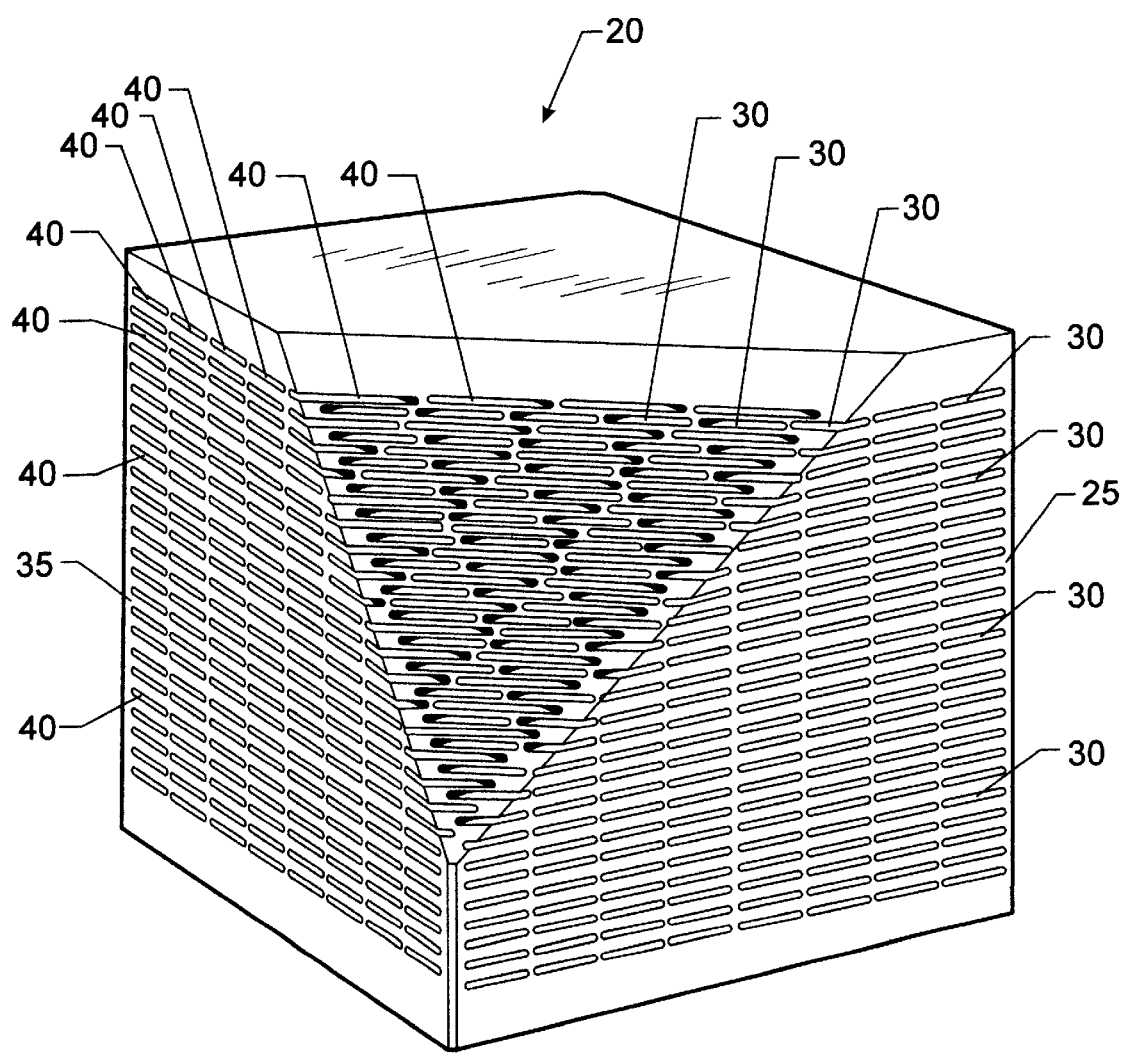
FIG. 1 is a perspective view with a cutaway section showing the interior alternating rows of one embodiment of the monolithic ionically conductive core of the present invention.

Referring to the drawings, FIG. 1 shows the monolithic ionically conductive core 20 of the present invention. This monolithic ionically conductive core is prepared by such fabrication techniques as injection molding, gel casting, slurry setting, hot pressing or any other technique known to those skilled in the art wherein two sets of passages are formed at the same time. Not only do these techniques afford a true monolith, as opposed to a laminate, but these techniques offer the versatility to design a monolithic ionically conductive core in a specific shape depending on the final use. The shape of the monolithic ionically conductive core shown in FIG. 1 is cubic. However, the monolithic ionically conductive core could also have other shapes such as a cylindrical shape.

The monolithic ionically conductive core is prepared from any ionically conductive material known to those skilled in the art such as an oxygen ion conductive ceramic, a proton conductive ceramic or a proton conductive polymer. The oxygen ion conductive ceramic is selected from the group consisting of: yttria-doped zirconia; rare earth-doped cerium oxide; and rare earth-doped bismuth oxide. The proton conductive ceramic is selected from the group consisting of barium cerate, strontium cerate, and rare earth cerates. An example of a proton conducting polymer is a perfluorinated ionomer known as NAFION which is commercially available from Dupont.

Referring to FIG. 1, the monolithic ionically conductive core 20 has an outer surface including a first entrance surface 25 and a first exit surface (not shown), which is spaced apart from the entrance surface. A first set of passages 30, made up of a plurality of single passages arranged in an array, are positioned between the first entrance surface 25 and the first exit surface (not shown) and extends across, down and through the monolithic ionically conductive core. The outer surface also includes a second entrance surface 35 and a second exit surface (not shown), spaced apart from the second entrance surface, a second set of passages 40 are located therebetween. The second set of passages 40 are also made-up of a plurality of single passages arranged in an array which extends across, down and through the monolithic ionically conductive core 20. The first set of passages are in a non-parallel relationship with the second set of passages. This is shown in the cutaway section of FIG. 1. For purposes of the present invention, non-parallel may be further defined as orthogonal, hexagonal and radial. Preferably, the relationship is orthogonal. The first set and the second set of passages preferably have a shape selected from the group consisting of: rectangular, square, triangular, circular and elliptical. Most preferably, the first set and the second set of passages have a rectangular shape. Moreover, the shape of the first set and the second set of passages may be tapered. Tapered is defined as the passage maintaining its width but changing in height as it extends from the entrance surface to the exit surface.

A first and second porous, electrically conductive coating is disposed within the first and second sets of passages, respectively. This coating enhances operability of the mass and energy transfer cell. The coating lines the interior of each passage but does not have to extend to the outer surface of the monolithic ionically conductive core. However, the coating may cover the outer surface of the monolithic ionically conductive core to enhance electrical conductivity. If the coating is extended to the outer surface of the monolithic ionically conductive core, necessary precautions should be taken so the first coating does not come into contact with the second coating causing the cell to short-out. The first set of passages are coated with a first porous, electrically conductive coating which serves as a cathode and the second set of passages are coated with a second porous, electrically conductive coating which serves as an anode. As a preferred embodiment, the first porous electrically conductive coating is prepared from a member selected from the group consisting of: lanthanum manganite, strontium-doped lanthanum manganite, a dispersed noble metal, a dispersed noble alloy, carbon, and ruthenuium oxide. The second porous, electrically conductive coating is preferably comprised of a material selected from the group consisting of: nickel-dispersed yttria-doped zirconia, a dispersed noble metal, a dispersed noble alloy, carbon, and ruthenium oxide. Whatever the composition of these porous, electrically conductive coatings, they must be compatible with or match the electrically conductive materials which are disposed within the passages.

Figure 2:
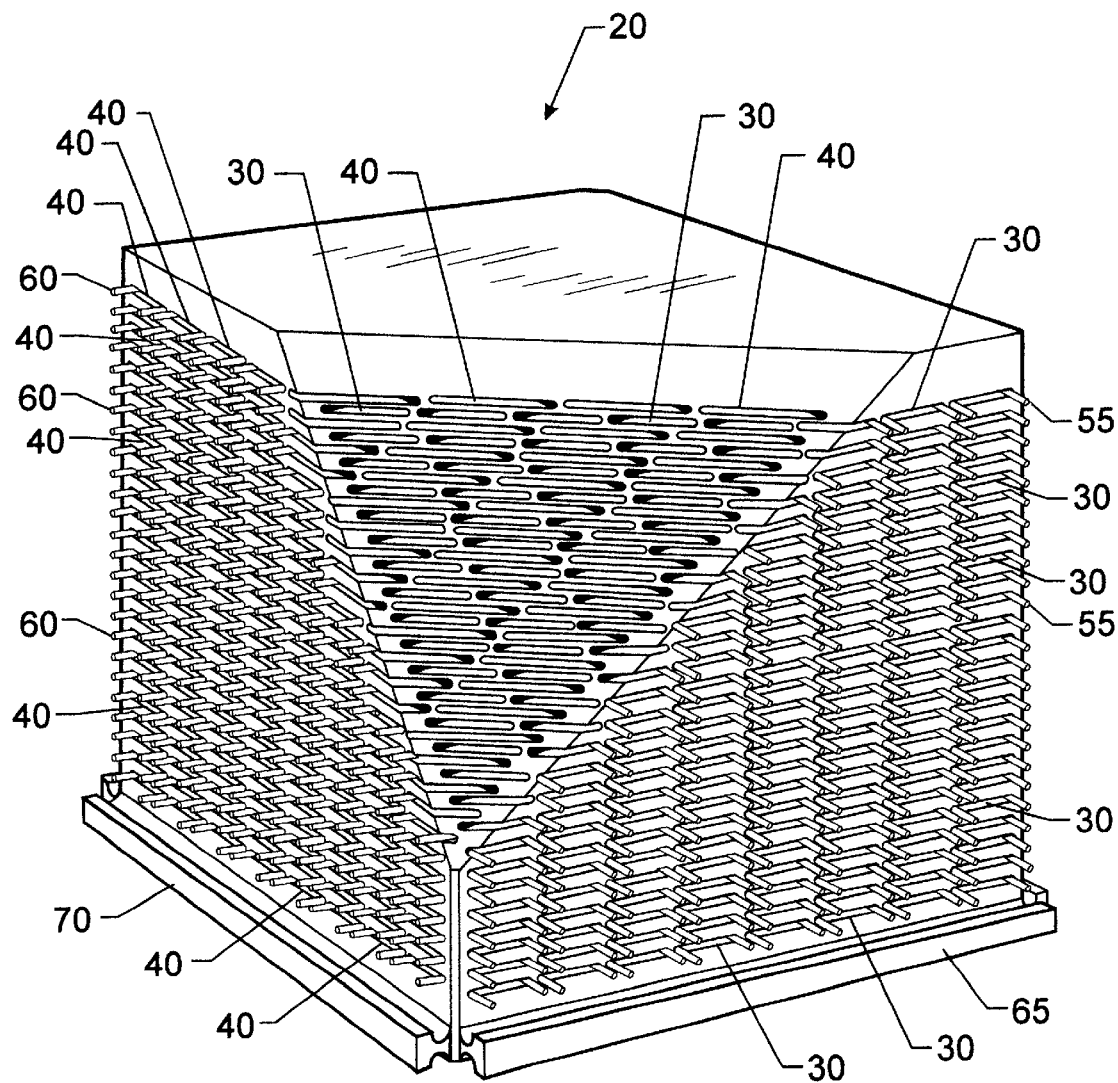
FIG. 2 is a perspective view with a cutaway section showing the interior alternating rows of the monolithic ionically conductive core of the present invention.

FIG. 2 shows a preferred embodiment for the monolithic mass and energy transfer cell where a first electrically conductive material 55 is disposed within and protrudes from the first set of coated passages 30 and a second electrically conductive material 60 is disposed within and protrudes from the second set of coated passages 40. The first electrically conductive material and the second electrically conductive material serve as current collectors for the monolithic mass and energy transfer cell. Although the first electrically conductive material and the second electrically conductive material are depicted as protruding from the first and second sets of coated passages, this is not a requirement. Moreover, the cell will function without the electrically conductive material, provided a porous, electrically conductive coating is disposed within the passages.

The first electrically conductive material must be compatible with the first porous, electrically conductive coating. The first electrically conductive material is preferably prepared from a member selected from the group consisting of: lanthanum manganite, strontium-doped lanthanum manganite, a dispersed noble metal, a dispersed noble alloy, carbon, and ruthenium oxide. The second electrically conductive material is preferably prepared from a member selected from the group consisting of: nickel-dispersed yttria-doped zirconia, a dispersed noble metal, a dispersed noble alloy, carbon, and ruthenium oxide. The first and second electrically conductive materials are preferably shaped into rods which are disposed within each respective set of passages and sintered into place by employing high temperature. As an alternative, the electrically conductive material is a mesh which is inserted into the appropriate set of passages. Preferably, at least one form of the electrically conductive material (for example, a rod, a hollow tube or mesh) is disposed within and protrudes from each passage. For example, if the electrically conductive material is shaped into a rod, two rods are disposed within and protrude from each passage. Since the electrically conductive material serves as a current collector, it becomes a part of the external electric circuit.

Figure 3:
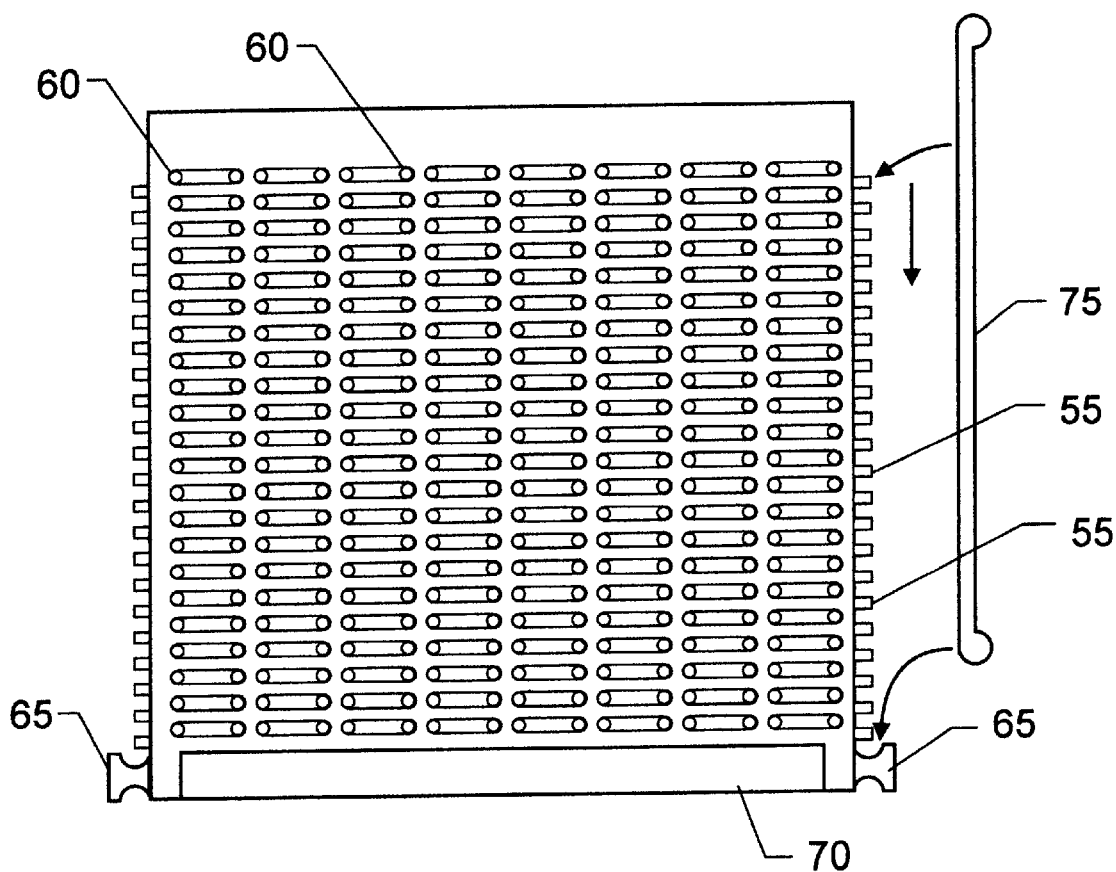
FIG. 3 is a side view of a preferred embodiment showing the external electric circuit of the present invention in electrical contact with the monolithic ionically conductive core.

FIG. 2 shows a first interlocking channel 65 and a second interlocking channel 70 protruding from the outer surface of the monolithic ionically conductive core 20. These interlocking channels are cast as a unibody piece of the monolithic ionically conductive core. The advantage to this design is there is no thermal mismatch between the interlocking channel and the monolithic ionically conductive core, which typically occurs at the adhesive bond layer. Although the interlocking channels are shown in their preferred configuration, where they protrude from the bottom of the monolithic ionically conductive core, the interlocking channels may protrude from the side or the top of the monolithic ionically conductive core as well. The interlocking channels are configured to allow for connecting two or more monolithic mass and energy transfer cells together by nesting the interlocking channel of a first monolithic mass and energy transfer cell into the interlocking channel of a second and many more monolithic mass and energy transfer cells to form an array. When this is done, the first set of passages must be properly matched to the first set of passages of the next monolithic mass and energy transfer cell to prevent shorting of the cell array. This is easy to achieve because the first set of passages are in a non-parallel relationship with the second set of passages. As a result, the passages are offset from each other. This is shown in the cutaway portion of FIG. 2. The second function of the interlocking channels is shown in FIG. 3. The first interlocking channel 65 is used as a support for the first electrically conductive perforated plate 75 which is a part of the external electric circuit.

The external electric circuit comprises any external circuitry known to those skilled in the art. For example, a wire may be contacted with the porous, electrically conductive coating which has been extended to the outer surface of the monolithic tonically conductive cell or the wire may be contacted with the electrically conductive material disposed within each set of passages. A preferred embodiment for the external electric circuit is shown in FIG. 3. The external electric circuit comprises a first electrically conductive perforated plate 75 and a second electrically conductive perforated plate(not shown), wherein the first electrically conductive perforated plate 75 is supported by the first interlocking channel 65 wherein the first electrically conductive perforated plate 75 is in electrical contact with the first electrically conductive material 55 and the second electrically conductive perforated plate is in electrical contact with the second electrically conductive material 60. The first electrically conductive perforated plate should not come into contact with the second electrically conductive perforated plate or the cell will short out.

The electrically conductive plate is comprised of the same electrically conductive material which is disposed in and protruding from the coated passage. For example, if the first set of passages has a strontium-doped lanthanum manganite rod disposed within and protruding from the first set of passages, the first electrically conductive perforated plate is comprised of strontium-doped lanthanum manganite. Alternatively, the second electrically conductive perforated plate is prepared from the same material as the second electrically conductive material disposed within and protruding from the second set of coated passages. The perforations match the second entrance surface and the second exit surface of the monolithic ionically conductive core.

The chemical cogeneration process for producing chemical products and cogenerating electrical energy of the present invention comprises the steps of providing a monolithic mass and energy transfer cell as described above. The monolithic mass and energy transfer cell is heated to a temperature ranging from about 25° C. to about 1000° C. This temperature is dependent on the gases introduced into the cell and the ionically conductive material which is used to prepare the monolithic ionically conductive core. For example, if $H_2S$ is introduced, the temperature is about 1000° C. For $NH_3$ the temperature is about 850° C. When the gas is $CH_3OH$ the cell is heated to about 700° C. and for $CH_4$ the cell is heated to about 400° C.

An oxidant is introduced into the first set of passages. The oxidant is any oxygen containing gas known to those skilled in the art and in particular is selected from the group consisting of: air, $N_2O$, $NO_2$, NO, $CO_2$, $SO_2$, $SO_3$, and steam. Most preferably, the oxidant is air.

A fuel is introduced into the second set of passages. The fuel is selected from the group consisting of hydrogen and a hydrocarbyl compound comprising from about 1 to about 20 carbons. The hydrocarbyl compound is either methane, ethane or natural gas.

The chemical products are recovered from the monolithic mass and energy transfer cell and the electric current is recovered through the external electric circuit.

Figure 4:
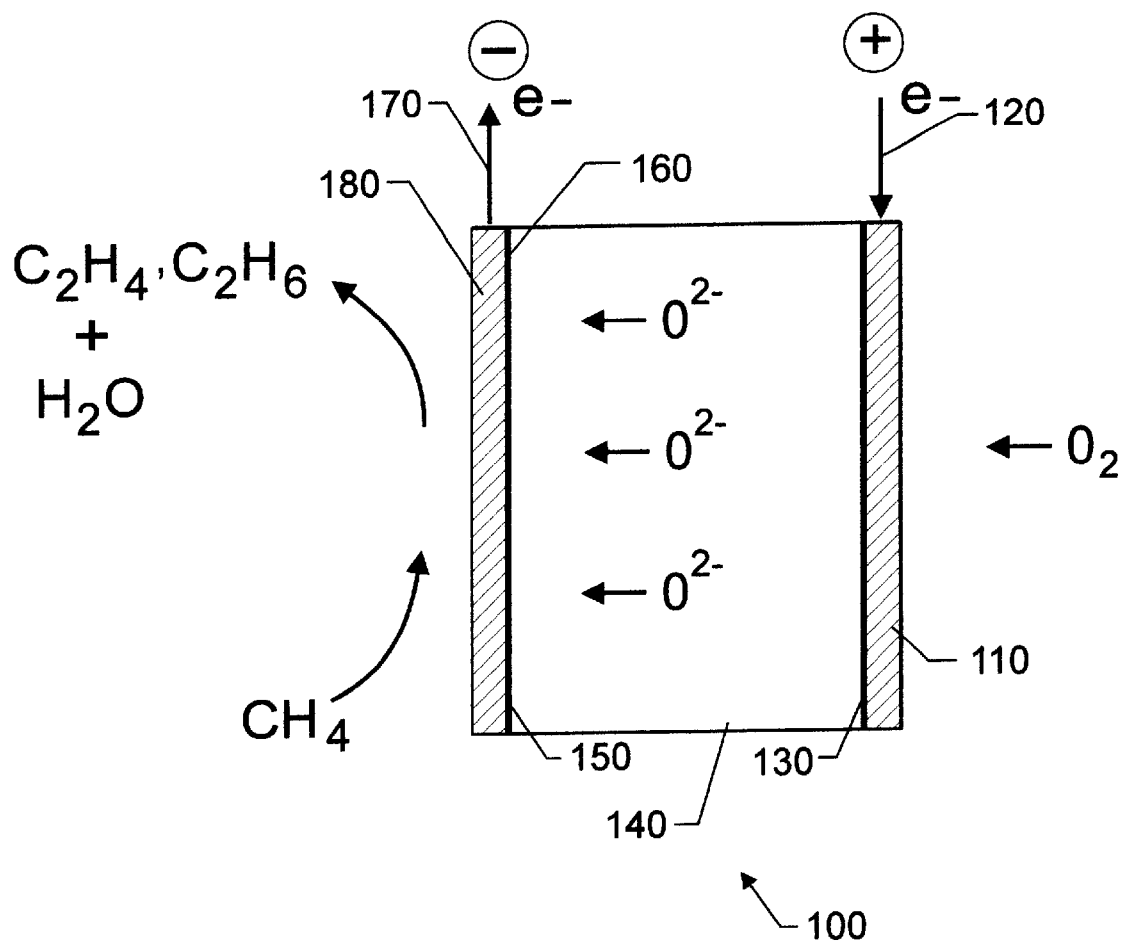
FIG. 4 is a schematic representation of the reactions which take place during the process of the present invention when the monolithic mass and energy transfer cell has an oxygen ion conductive ceramic core.

FIG. 4 is a schematic representation of the chemical reactions taking place when the monolithic ionically conductive core is an oxygen ion conducting ceramic core such as that prepared from ytrria-doped zirconia. An oxidant enters the heated monolithic mass and energy transfer cell 100 through the first set of passages and comes into contact with the first porous, electrically conductive coating or cathode 110. A current is introduced into the cell at the cathode 110 through the external electric circuit 120. The oxygen is reduced to $O^{2-}$ in the cathode 110 and passes through the cathode/electrolyte interface 130 and into the monolithic oxygen conducing ceramic core 140. The $O^{2-}$ passes on to the anode/cathode interface 150. The anode 160 is comprised of the second, porous electrically conductive coating. At the anode 160, the fuel contacts the anode interface 180 as it enters the second set of passages. The chemical products are recovered from the monolithic mass and energy transfer cell and the electric current is recovered through the external electric circuit 170.

Figure 5:
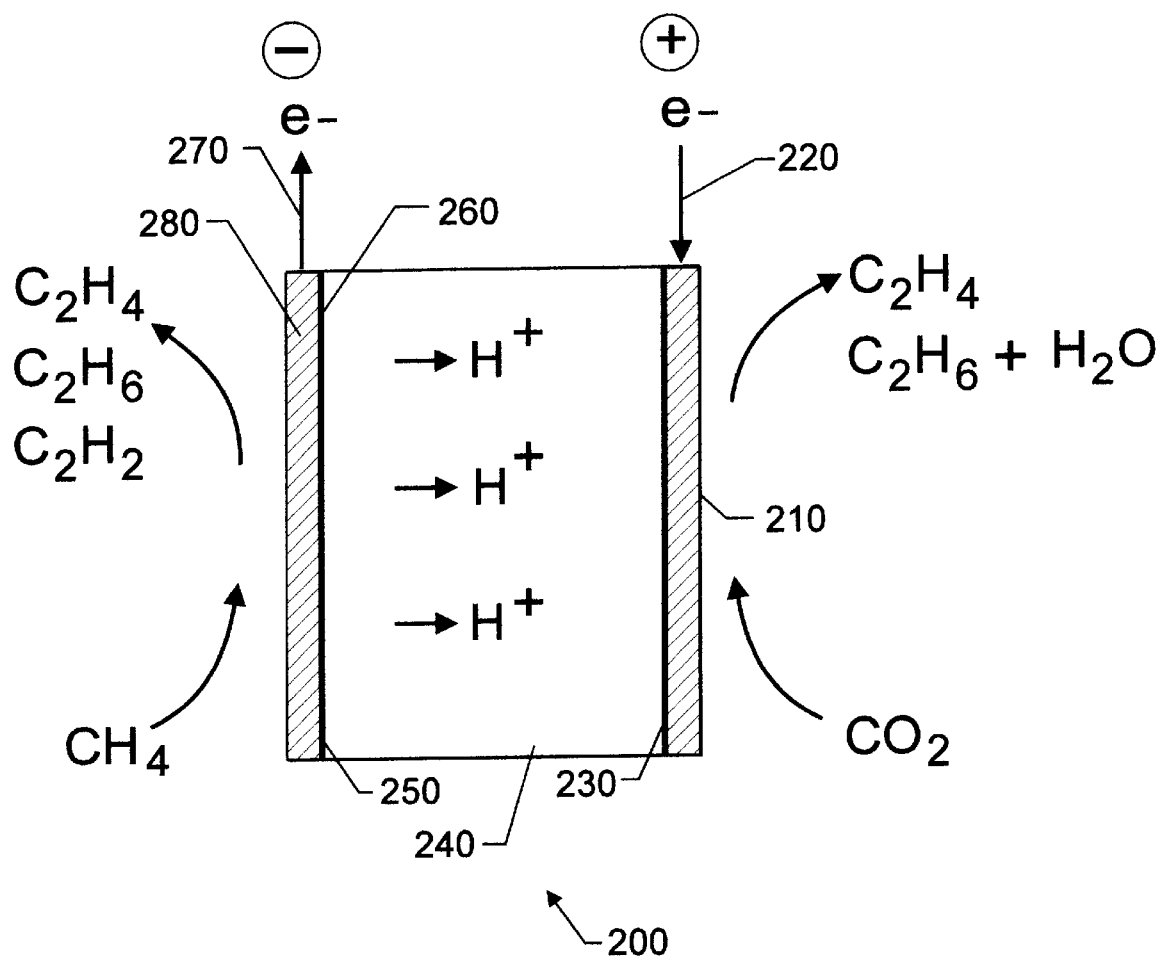
FIG. 5 is a schematic representation of the reactions which take place during the process of the present invention when the monolithic mass and energy transfer cell has a proton conductive ceramic core.

FIG. 5 is a schematic representation of the chemical reactions taking place when the monolithic ionically conductive core is a proton conducting ceramic core. An oxidant enters the heated monolithic mass and energy transfer cell 200 through the first set of passages and comes into contact with the first porous, electrically conductive coating or the cathode 210. A current is introduced into the cell at the cathode 210 through the external electric circuit 220. A fuel such as methane gas is introduced into the second set of passages. The fuel first comes into contact with the second, porous electrically conductive coating 260 and contacts the anode 280 interface 260. Hydrogen ions, $H^+$, pass through the proton conducting ceramic 240 where the ions react at the cathode interface 230. The electric current is recovered through the external electric circuit 270.

Figure 6:
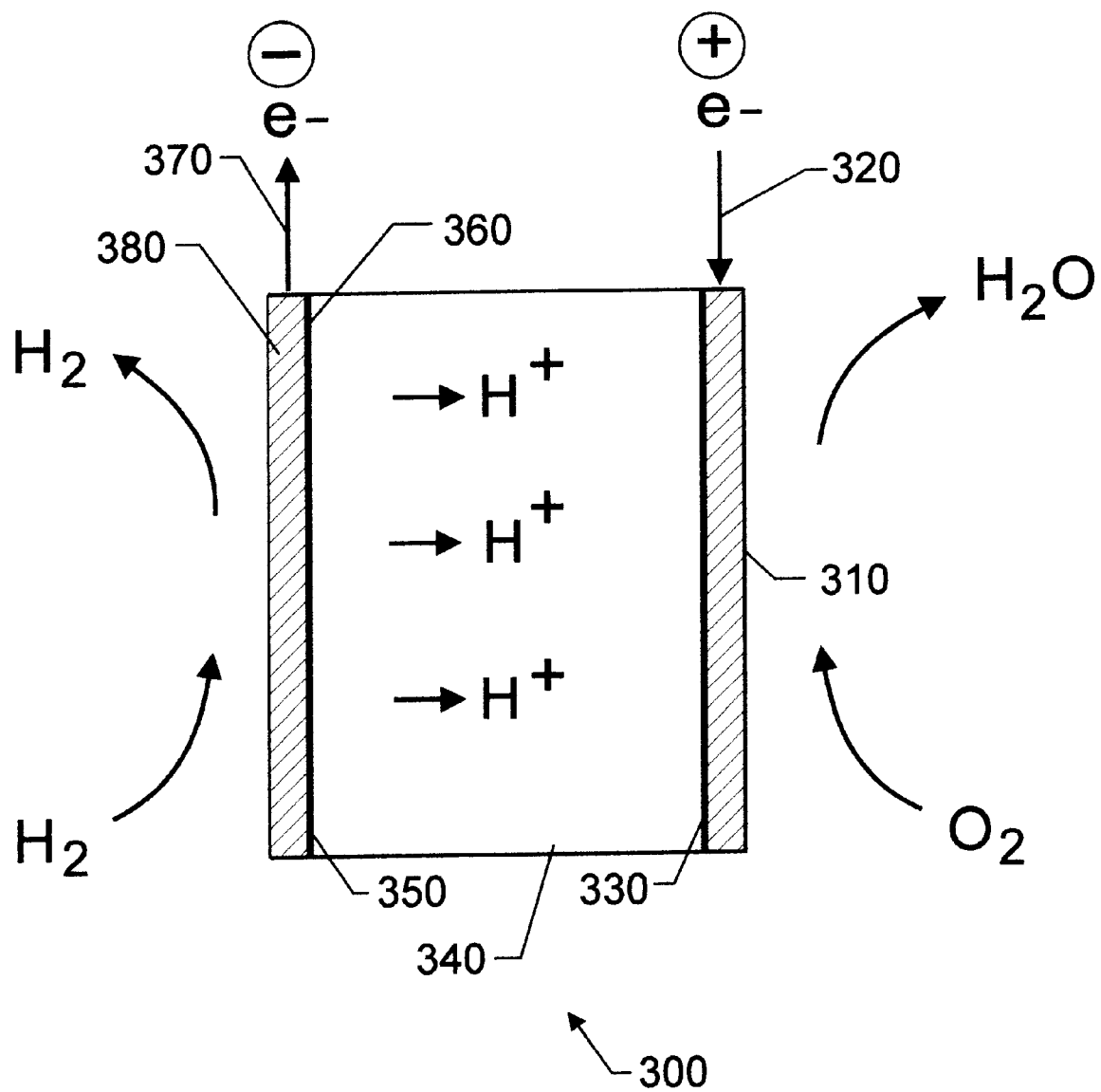
FIG. 6 is a schematic representation of the reactions which take place during the process of the present invention when the monolithic mass and energy transfer cell has a proton conductive polymer core.

FIG. 6 is a schematic representation of the chemical reactions taking place when the monolithic ionically conductive core is a proton conductive polymer core. An oxidant enters the heated monolithic mass and energy transfer cell 300 through the first set of passages and comes into contact with the first porous, electrically conductive coating or the cathode 310. A current is introduced into the cell at the cathode 310 through the external electric circuit 320. A fuel such as hydrogen gas is introduced into the second set of passages. The fuel first comes into contact with the second, porous electrically conductive coating 360 and contacts the anode 380 interface 360. Hydrogen ions, $H^+$, pass through the proton conducting polymer 340 where the ions react at the cathode interface 330. The electric current is recovered through the external electric circuit 370.

EXAMPLES

Example 1

To follow is a description of a chemical cogeneration process for producing chemical products and cogenerating electrical energy when the monolithic ionically conductive core is prepared from an oxygen ion conductive ceramic. A monolithic mass and energy transfer cell is prepared by providing a monolithic oxygen ion conductive ceramic core using yttria-doped zirconia. The monolithic oxygen ion conductive ceramic core has an outer surface including a first entrance surface and a first exit surface spaced apart from the first entrance surface, a first set of passages therebetween and a second entrance surface and a second exit surface spaced apart from the second entrance surface, a second set of passages therebetween wherein the second set of passages are in an orthogonal relationship to the first set of passages. This core is prepared by either injection molding, gel casting, slurry setting or hot pressing. A first porous, electrically conductive coating serving as a cathode is disposed within the first set of passages. The first porous, electrically conductive coating is prepared from strontium-doped lanthanum manganite. A second porous, electrically conductive coating serving as an anode is disposed within the second set of passages wherein the second porous, electrically conductive coating is prepared from nickel-dispersed doped zirconia. A first electrically conductive material prepared from strontium-doped lanthanum manganite is disposed within the first set of passages and a second electrically conductive material prepared from nickel-dispersed doped-zirconia is disposed within the second set of passages. An external electric circuit is in electrical contact with the monolithic oxygen ion conductive ceramic core.

The monolithic mass and energy transfer cell is heated to a temperature ranging from about 300° C. to about 1000° C. Air is introduced into the first set of passages. Natural gas is introduced into the second set of passages. Chemical products are recovered from the monolithic mass and energy transfer cell and an electric current is recovered through the external electric circuit.

Example 2

To follow is a description of a chemical cogeneration process for producing chemical products and cogenerating electrical energy when the monolithic ionically conductive core is prepared from a proton conductive polymer. A monolithic mass and energy transfer cell is prepared from a monolithic proton conductive polymer core which has been prepared from a perfluorinated ionomer. The monolithic proton conductive polymer core has an outer surface including a first entrance surface and a first exit surface spaced apart from the first entrance surface, a first set of passages therebetween and a second entrance surface and a second exit surface spaced apart from the second entrance surface, a second set of passages therebetween wherein the second set of passages are in an orthogonal relationship to the first set of passages. A first porous, electrically conductive coating serves as a cathode and is disposed within the first set of passages. The first porous, electrically conductive coating is prepared from a member selected from the group consisting of: a dispersed noble metal, a dispersed noble alloy, and carbon. A second porous, electrically conductive coating serves as an anode and is disposed within the second set of passages. The second porous, electrically conductive coating is prepared from a member selected from the group consisting of: a dispersed noble metal, a dispersed noble alloy, and carbon. A first electrically conductive material prepared from a member selected from the group consisting of: a dispersed noble metal, a dispersed noble alloy, and carbon is disposed within the first set of passages and a second electrically conductive material prepared from a member selected from the group consisting of: a dispersed noble metal, a dispersed noble alloy, and carbon is disposed within the second set of passages. An external electric circuit is in electrical contact with the monolithic oxygen ion conductive ceramic core.

The monolithic mass and energy transfer cell is heated to a temperature ranging from about 25° C. to about 90° C. Air is introduced into the first set of passages and hydrogen is introduced into the second set of passages. Chemical products are recovered from the monolithic mass and energy transfer cell and an electric current is recovered through the external electric circuit.

The above description and drawings are only illustrative of preferred embodiments which achieve the objects, features and advantages of the present invention, and it is not intended that the present invention be limited thereto. Any modification of the present invention which comes within the spirit and scope of the following claims is considered part of the present invention.

What is claimed is:

1. A chemical cogeneration process for producing chemical products and cogenerating electrical energy, the process comprising the steps of:

a) providing a monolithic mass and energy transfer cell comprising: a monolithic ionically conductive core having an outer surface including a first entrance surface and a first exit surface spaced apart from the first entrance surface, a first set of passages therebetween and a second entrance surface and a second exit surface spaced apart from the second entrance surface, a second set of passages therebetween wherein the second set of passages are in a non-parallel relationship to the first set of passages;

a first porous, electrically conductive coating serving as a cathode, wherein the first porous, electrically conductive coating is disposed within the first set of passages;

a second porous, electrically conductive coating serving as an anode, wherein the second porous, electrically conductive coating is disposed within the second set of passages;

a first electrically conductive material disposed within the first set of passages;

a second electrically conductive material disposed within the second set of passages; and an external electric circuit in electrical contact with the monolithic ionically conductive core;

b) heating the monolithic mass and energy transfer cell to a temperature ranging from about 25° C. to about 1000° C.;

c) introducing a current from the external electric circuit into the cathode of the monolithic mass and energy transfer cell;

d) introducing an oxidant into the first set of passages;

e) introducing a fuel into the second set of passages;

f) recovering chemical products from the monolithic mass and energy transfer cell; and g) recovering an electric current through the external electric circuit at the anode.

2. A chemical cogeneration process for producing chemical products and cogenerating electrical energy according to claim 1, wherein the oxidant is an oxygen-containing gas selected from the group consisting of: air, $N_2O$, $NO_2$, NO, $CO_2$, $SO_2$, $SO_3$, and steam.

3. A chemical cogeneration process for producing chemical products and cogenerating electrical energy according to claim 2, wherein the oxidant is air.

4. A chemical cogeneration process for producing chemical products and cogenerating electrical energy according to claim 1, wherein the fuel is selected from the group consisting of: hydrogen and a hydrocarbyl compound comprising from about 1 to about 20 carbons.

5. A chemical cogeneration process for producing chemical products and cogenerating electrical energy, the process comprising the steps of:

a) providing a monolithic mass and energy transfer cell comprising: a monolithic oxygen ion conductive ceramic core prepared from yttria-doped zirconia wherein the monolithic oxygen ion conductive ceramic core has an outer surface including a first entrance surface and a first exit surface spaced apart from the first entrance surface, a first set of passages therebetween and a second entrance surface and a second exit surface spaced apart from the second entrance surface, a second set of passages therebetween wherein the second set of passages are in an orthogonal relationship to the first set of passages;

a first porous, electrically conductive coating serving as a cathode and disposed within the first set of passages wherein the first porous, electrically conductive coating is prepared from strontium-doped lanthanum manganite;

a second porous, electrically conductive coating serving as an anode and disposed within the second set of passages wherein the second porous, electrically conductive coating is prepared from nickel-dispersed doped zirconia;

a first electrically conductive material prepared from strontium-doped lanthanum manganite wherein the first electrically conductive material is disposed within the first set of passages;

a second electrically conductive material prepared from nickel-dispersed doped-zirconia wherein the second electrically conductive material is disposed within the second set of passages; and an external electric circuit in electrical contact with the monolithic oxygen ion conductive ceramic core;

b) heating the monolithic mass and energy transfer cell to a temperature ranging from about 300° C. to about 1000° C.;

c) introducing a current from the external electric circuit into the cathode of the monolithic mass and energy transfer cell;

d) introducing air into the first set of passages;

e) introducing natural gas into the second set of passages;

f) recovering chemical products from the monolithic mass and energy transfer cell; and g) recovering an electric current through the external electric circuit at the anode.

6. A chemical cogeneration process for producing chemical products and cogenerating electrical energy, the process comprising the steps of:

a) providing a monolithic mass and energy transfer cell comprising: a monolithic proton conductive polymer core prepared from a perfluorinated ionomer wherein the monolithic proton conductive polymer core has an outer surface including a first entrance surface and a first exit surface spaced apart from the first entrance surface, a first set of passages therebetween and a second entrance surface and a second exit surface spaced apart from the second entrance surface, a second set of passages therebetween wherein the second set of passages are in an orthogonal relationship to the first set of passages;

a first porous, electrically conductive coating serving as a cathode and disposed within the first set of passages wherein the first porous, electrically conductive coating is prepared from a member selected from the group consisting of: a dispersed noble metal, a dispersed noble alloy, and carbon;

a second porous, electrically conductive coating serving as an anode and disposed within the second set of passages wherein the second porous, electrically conductive coating is prepared from a member selected from the group consisting of: a dispersed noble metal, a dispersed noble alloy, and carbon;

a first electrically conductive material prepared from a member selected from the group consisting of: a dispersed noble metal, a dispersed noble alloy, and carbon wherein the first electrically conductive material is disposed within the first set of passages;

a second electrically conductive material prepared from a member selected from the group consisting of: a dispersed noble metal, a dispersed noble alloy, and carbon; wherein the second electrically conductive material is disposed within the second set of passages; and an external electric circuit in electrical contact with the monolithic oxygen ion conductive ceramic core;

b) heating the monolithic mass and energy transfer cell to a temperature ranging from about 25° C. to about 90° C.;

c) introducing a current from the external electric circuit into the cathode of the monolithic mass and energy transfer cell;

d) introducing air into the first set of passages;

e) introducing hydrogen into the second set of passages;

f) recovering chemical products from the monolithic mass and energy transfer cell; and g) recovering an electric current through the external electric circuit at the anode.

7. A chemical cogeneration cell comprising:

a monolithic ionically conductive core, wherein the monolithic ionically conductive core is prepared from an ionically conductive material selected from the group consisting of: an oxygen ion conductive ceramic; a proton conductive ceramic; and a proton conductive polymer; and wherein the monolithic ionically conductive core has an outer surface including a first entrance surface and a first exit surface spaced apart from the first entrance surface, a first set of passages therebetween and a second entrance surface and a second exit surface spaced apart from the second entrance surface, a second set of passages therebetween wherein the second set of passages are in a nonparallel relationship to the first set of passages;

a first porous, electrically conductive coating serving as a cathode, wherein the first porous, electrically conductive coating is disposed within the first set of passages and wherein the first porous, electrically conductive coating is prepared from a member selected from the group consisting of: lanthanum manganite, strontium-doped lanthanum manganite, a dispersed noble metal, a dispersed noble alloy, carbon, and ruthenium oxide;

a second porous, electrically conductive coating serving as an anode, wherein the second porous, electrically conductive coating is disposed within the second set of passages and wherein the second porous, electrically conductive coating is prepared from a member selected from the group consisting of: nickel-dispersed yttria-doped zirconia, a dispersed noble metal, a dispersed noble alloy, carbon, and ruthenium oxide;

a first electrically conductive material disposed within the first set of passages wherein the first electrically conductive material is prepared from a member selected from the group consisting of: lanthanum manganite, strontium-doped lanthanum manganite, a dispersed noble metal, a dispersed noble alloy, carbon, and ruthenium oxide;

a second electrically conductive material disposed within the second set of passages wherein the second electrically conductive material is prepared from a member selected from the group consisting of: nickel-dispersed yttria-doped zirconia, a dispersed noble metal, a dispersed noble alloy, carbon, and ruthenium oxide; and an external electric circuit in electrical contact with the monolithic ionically conductive core.

8. A chemical cogeneration cell according to claim 7, wherein the oxygen ion conductive ceramic core is prepared from a member selected from the group consisting of: yttria-doped zirconia, rare earth-doped cerium oxide, and rare earth-doped bismuth oxide.

9. A chemical cogeneration cell according to claim 7, wherein the proton conductive ceramic core is prepared from a member selected from the group consisting of: barium cerate, strontium cerate, and a rare earth cerate.

10. A chemical cogeneration cell according to claim 7, wherein the proton conductive polymer core is prepared from a perfluorinated ionomer.

* * * * *